United States Patent
Shimada et al.

(10) Patent No.: US 6,800,145 B2
(45) Date of Patent: Oct. 5, 2004

(54) RARE EARTH MAGNET ALLOY, MANUFACTURING METHOD THEREOF AND PRODUCT APPLIED WITH RARE EARTH MAGNET ALLOY

(75) Inventors: Munekatsu Shimada, Tokyo (JP); Hideaki Ono, Kanagawa-ken (JP)

(73) Assignee: Nissan Motor Co., Ltd., Kanagawa-Ken (JP)

(*) Notice: Subject to any disclaimer, the term of this patent is extended or adjusted under 35 U.S.C. 154(b) by 76 days.

(21) Appl. No.: 10/146,900

(22) Filed: May 17, 2002

(65) Prior Publication Data

US 2003/0062097 A1 Apr. 3, 2003

(30) Foreign Application Priority Data

May 17, 2001 (JP) .................................... P2001-147831

(51) Int. Cl.[7] .............................................. H01F 1/057
(52) U.S. Cl. ........................ 148/302; 75/244; 310/159; 310/173; 310/179; 148/101; 148/102; 164/462; 164/463; 164/479
(58) Field of Search ................................. 148/302, 101, 148/102; 420/83, 121; 75/244; 310/159, 173, 179; 164/462, 463, 479

(56) References Cited

U.S. PATENT DOCUMENTS

| 5,545,266 | A | * | 8/1996 | Hirosawa et al. ............ 148/302 |
| 6,261,385 | B1 | * | 7/2001 | Nomura et al. ............. 148/301 |
| 6,302,972 | B1 | * | 10/2001 | Hirosawa et al. ............ 148/302 |
| 6,589,367 | B2 | * | 7/2003 | Nomura et al. ............. 148/302 |

FOREIGN PATENT DOCUMENTS

| JP | 7-173501 | 7/1995 |
| JP | 7-176417 | 7/1995 |
| JP | 11-8109 | 1/1999 |
| JP | 11-97222 | 4/1999 |
| JP | 2000-235909 | 8/2000 |

OTHER PUBLICATIONS

Machine Generated English Language Translation of Japanese Patent Document No. 2001–235909, Aug. 29, 2000.*
Masato Sagawa et al., "Nd–Fe–B Permanent Magnet Materials", Japanese Journal of Applied Physics, vol. 26, No. 6, Jun. 1987, pp. 785–800.
R.W. Lee, "Hot–pressed neodymium–iron–boron magnets", Appl. Phys. Lett. 46 (8), Apr. 15, 1985, 790–791.
T. Takeshita et al., "Magnetic Properties and Microstructures of the NdFeB Magnet Powder Produced by Hydrogen Treatment", Central Research Institute, Mitsubishi Metal Corp., pp. 551–557.
Eckart F. Kneller et al., "The Exchange–Spring Magnet: A New Material Principle for Permanent Magnets", IEEE Transactions on Magnetics, vol. 27, No. 4, Jul. 1991, pp. 3588–3600.
Ralph Skomski et al., "Giant energy product in nanostructured two–phased magnets", Physical Review B, vol. 48, No. 21, Dec. 1, 1993–I, pp. 15812–15816.

(List continued on next page.)

Primary Examiner—John P. Sheehan
(74) Attorney, Agent, or Firm—McDermott Will & Emery LLP (57) ABSTRACT

A Nd—Fe—B type rare earth magnet alloy is provided with hard magnetic phases each of which has a size equal to or less than 80 nm, soft magnetic phases each of which has a size equal to or less than 80 nm, with the hard and soft magnetic phases being present in a mixed structure, and partly anisotropic regions wherein axes of easy magnetization of the hard magnetic phases are aligned in one direction and each having a size equal to or greater than 0.1 μm. Such a magnet alloy is obtained using a strip casting method or ultra cooling method and serves as material for an anisotropic exchange spring magnet to be applied to a motor.

17 Claims, 2 Drawing Sheets

OTHER PUBLICATIONS

L. Withanawasam et al., "Nanocomposite $R_2Fe_{14}B$/Fe exchange coupled magnets", J. Appl. Phys. 76 (10), Nov. 15, 1994, pp. 7065–7067.

R. Coehourn et al., "Ovel Permanent Magnetic Materials Made by Rapid Quenching", Journal de Physique, C8–669–670.

* cited by examiner

RARE EARTH MAGNET ALLOY, MANUFACTURING METHOD THEREOF AND PRODUCT APPLIED WITH RARE EARTH MAGNET ALLOY

BACKGROUND OF THE INVENTION

The present invention relates to a rare earth magnet alloy, a manufacturing method thereof and a product applied with the rare earth magnet alloy and, more particularly, to a technology for simply and easily manufacturing an anisotropic exchange spring magnet having an excellent magnetic property.

Magnets to be used in motors involve a Nd—Fe—B type permanent magnet, having high magnetic properties, which has been proposed to be manufactured by a melting technique (refer to M. Sagawa et al.: Japanese Journal of Applied Physics 26 (1987) 785) and a ultra cooling technique (refer to R. W. Lee: Applied Physics Letter 46 (1985) 790). In order to improve a coercive force by forming fine crystals in the magnet, an attempt has been proposed to use a HDDR treatment (refer to T. Takeshita et al.: Proc. 10th Int. Workshop on Rare Earth Magnets and Their Application, Kyoto, (1989) 551). Further, another technique has been proposed to add one or more of elements of Co, Ga, Zr and Hf to cause the resulting magnet powder to have an anisotropy. With such a structure, theoretically, the Nd—Fe—B type permanent magnet tends to have preferable magnet properties.

However, the Nd—Fe—B type magnet in such a structure is nearing to a theoretical limiting value of magnetic properties.

For this reason, a development for a following generation's magnet with improved several performances is required and so a great attention is recently focused onto an exchange spring magnet (refer to E. F. Kneller and R. Hawig: IEEE Transaction Magnetics 27 (1991) 3588). The exchange spring magnet is comprised of compositions which include hard magnetic phases (hereinafter suitably referred to as hard phases) and soft magnetic phases (hereinafter suitably referred to as soft phases) that are finely dispersed in the order of several tens nm scale, with magnetizations of the both phases combining with one another due to an exchanging mutual reaction to preclude the magnetization of the soft phase not to be easily reversed to cause the magnet to totally serve as a single hard phase, and is also referred to as a nanocomposite magnet. In the compositions of $Sm_2Co_{17}N_3$/Fe—Co, theoretically, it is reported that the presence of the anisotropic property given to the magnet allows the magnet to have the maximum energy product of a value such as $(BH)_{max}$=137 MGOe (refer to R. Skomski and J. M. D. Corey: Physical Review B48 (1993) 15812).

"R. Coehoorn et al.: Journal de Physique 49 (1988)" discloses a method of manufacturing $Nd_2Fe_{14}B/Fe_3B$ type exchange spring magnet. Also, Japanese Patent Application Laid-Open Publication No. H7-173501, Japanese Patent Application Laid-Open Publication No. H7-176417 and "L. Withanasam et al.: Journal of Applied Physics 76 (1994) 7065" disclose methods for manufacturing $Nd_2Fe_{14}B$/Fe type exchange spring magnet.

However, since a melt spun technique and a mechanical alloying (MA) technique disclosed in the above literatures have a difficulty in aligning a crystalline direction, only an isotropic exchange spring magnet is obtained. It is hard to say that the related art techniques take a full advantage of the benefits of the characteristic of the exchange spring magnet.

Now, manufacturing methods for an anisotropic exchange spring magnet have heretofore been proposed such as a method for heating Nd—Fe—B amorphous metal in a strong magnetic field to form crystals (refer to Japanese Patent Application Laid-Open Publication No. H11-8109), a method for hot working a thin strip alloy to be rapidly cooled such that hard and soft phases are finely dispersed to be deposited (refer to Japanese Patent Application Laid-Open Publication No. H11-97222), and a method for rapidly increasing the temperature of a thin strip alloy to be rapidly cooled to directly achieve hot processing for one-axis deformation (refer to Japanese Patent Application Laid-Open Publication No. 2000-235909).

SUMMARY OF THE INVENTION

However, the anisotropic exchange spring magnets manufactured in such related art methods still face insufficient results in the magnetic properties, and there has heretofore been a long-awaited realization for manufacturing the anisotropic exchange spring magnet in a more simple and easy fashion.

The present invention has been made with the above view and has an object to provide a rare earth magnet alloy, a method for manufacturing such a rare earth magnet alloy suitable for simply and easily producing an anisotropic exchange spring magnet having excellent magnetic properties, and also products applied with such a rare earth magnet alloy.

That is, upon study of various attempts and studies made by the present inventors, it has been revealed that the use of a procedure, wherein the rare earth magnet alloy, which is magnetically isotropic as a whole but includes regions (hereinafter suitably referred to as partly anisotropic regions) in each of which the hard phases (single crystal particles) and soft phases (single crystal particles) are finely dispersed and the hard phases have axes of easy magnetization that is aligned in one direction, is used as a starting material and then such a starting material is crushed to a particle size of equal to or less than the sizes of the partly anisotropic regions, enables a production of the anisotropic exchange spring magnet having excellent magnetic properties. That is, the present invention has been completed while realistically establishing various process conditions of such a procedure. More particularly, by crushing such a magnet alloy to a particle size of equal to or less than the sizes of the partly anisotropic regions so as to obtain magnetic powder and then pressing the powder of the crushed alloy in a magnetic field, it is possible to obtain a pressed powder body having the magnetic anisotropy. And, by subjecting the resulting pressed powder body to a sintering process under a condition such that the crystalline sizes are not in enlarged, the anisotropic exchange spring magnet having the excellent magnetic properties are reliably and easily obtained.

According to one aspect of the present invention, there is provided Nd—Fe—B type rare earth magnet alloy comprising: hard magnetic phases each of which has a size equal to or less than 80 nm; soft magnetic phases each of which has a size equal to or less than 80 nm, with the hard and soft magnetic phases being present in a mixed structure; and partly anisotropic regions wherein axes of easy magnetization of the hard magnetic phases are aligned in one direction, each of the partly anisotropic regions having a size equal to or greater than 0.1 $\mu$m.

Further, the present invention provides a method of manufacturing a Nd—Fe—B type rare earth magnet alloy, which comprises: preparing an ingot of Nd—Fe—B type rare earth magnet composition; obtaining a molten mass of the ingot of the Nd—Fe—B type rare earth composition; and subjecting the molten mass to a rapid cooling treatment to obtain an alloy of Nd—Fe—B type rare earth magnet. Here, the alloy of Nd—Fe—B type rare earth magnet comprises: hard magnetic phases each of which has a size equal to or less than 80 nm; soft magnetic phases each of which has a size equal to or less than 80 nm, with the hard and soft magnetic phases being present in a mixed structure; and partly anisotropic regions wherein axes of easy magnetization of the hard magnetic phases are aligned in one direction, each of the partly anisotropic regions having a size equal to or greater than 0.1 $\mu$m.

Furthermore, the present invention provides a method of manufacturing an anisotropic exchange spring magnet, which comprises: preparing an alloy of Nd—Fe—B type rare earth magnet; crushing the alloy of Nd—Fe—B type rare earth magnet to a size equal to or less than the size of each of the partly anisotropic regions to obtain magnet powder; pressing the magnet powder in a magnetic field to obtain a pressed powder body; and subjecting the pressed powder body to a pressing and sintering treatment in a discharge plasma to obtain a bulk magnet. Here, the alloy of Nd—Fe—B type rare earth magnet comprises: hard magnetic phases each of which has a size equal to or less than 80 nm; soft magnetic phases each of which has a size equal to or less than 80 nm, with the hard and soft magnetic phases being present in a mixed structure; and partly anisotropic regions wherein axes of easy magnetization of the hard magnetic phasess are aligned in one direction, each of partly anisotropic regions having a size equal to or greater than 0.1 $\mu$m.

Also, according to another aspect of the present invention, there is provided a motor comprising: a stator; windings located in the stator; a rotor opposed to the stator; and magnets each of which is mounted on the rotor and is an anisotropic exchange spring magnet comprised of an alloy of Nd—Fe—B type rare earth magnet. Here, the alloy of Nd—Fe—B type rare earth magnet alloy comprises: hard magnetic phases each of which has a size equal to or less than 80 nm; soft magnetic phases each of which has a size equal to or less than 80 nm, with the hard soft magnetic phases being present in a mixed structure; and partly anisotropic regions wherein axes of easy magnetization of the hard magnetic phases are aligned in one direction, each of partly anisotropic regions having a size equal to or greater than 0.1 $\mu$m.

Other and further features, advantages, and benefits of the present invention will become more apparent from the following description taken in conjunction with the following drawings.

DETAILED DESCRIPTION OF THE PREFERRED EMBODIMENTS

Initially, before entering into a detailed description of a preferred embodiment of the present invention, a magnet alloy, a magnet and a motor will be described below in detail. The preferred embodiment contemplates the provision of a Nd—Fe—B type magnet alloy which is comprised of a hard phase (hard magnetic phase), which is a single crystal particle, and a soft phase (soft magnetic phase), which is a single crystal particle, with these both phases being finely dispersed as a mixed structure, wherein each of the hard phases and the soft phases has a size equal to or less than 80 nm and wherein partly anisotropic regions, i.e. regions in each of which axes of easy magnetization of the hard phases are orientated in the same direction have a size equal to or greater than 0.1 $\mu$m, and also the use of the Nd—Fe—B type magnet alloy to obtain an anisotropic exchange spring magnet.

Figure 1:
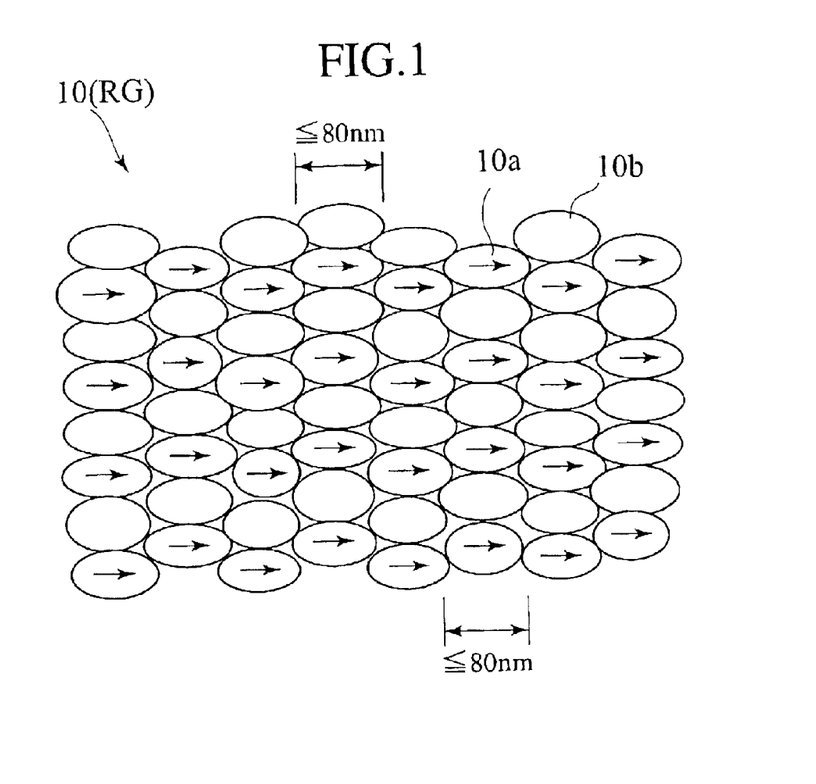
FIG. 1 is a schematic view of a magnet alloy of a preferred embodiment according to the present invention.

FIG. 1 shows a schematic view of a magnet alloy 10 of the preferred embodiment, which is representatively shown as having a region RG (hereinafter suitably referred to as a partly anisotropic region) including the particles of the hard phases 10$a$ encircled with respective arrows, indicative of the axes of easy magnetization, and the particles of the soft phases 10$b$ encircled with no arrows. More specifically, in the partly anisotropic region, the axes of easy magnetization of the hard phases 10$a$ are aligned in the same orientation. Also, in the magnet alloy 10 of the preferred embodiment, as viewed on a slightly enlarged macro-scale, many partly anisotropic regions exist and such partly anisotropic regions are combined and mixed to form a texture, which is to be defined as the combined and mixed structure comprised of the partly anisotropic regions. And resultantly, an entire structure of the magnet alloy 10 includes many textures, i.e. such an alloy 10 is configured as an aggregate body of the textures, and thus exhibits a magnetic isotropy as a whole. Incidentally, in the presently filed preferred embodiment, the magnet alloy 10 may take any form such as a crystalline-alloy thin strip or coarsely crashed intermediate body and is not limited to particular shapes or structure of the alloy.

The sizes and the mixed structure of the hard phase 10$a$ and the soft phase 10$b$ can be identified using a scanning electron micro scope (hereinafter suitably referred to as SEM) and, during such identification, the sizes (hereinafter suitably referred to as crystalline sizes) of the hard phase 10$a$ and the soft phase 10$b$ are defined as the maximum diameters. The bigger the crystalline size, the lower will be the exchanging mutual reaction. Thus, it is required for the crystals to have a size equal to or less than 80 nm, more preferably equal to or less than 60 nm. The present invention is not particularly limited to a lower limit of the crystalline size. The smaller the crystalline size, the stronger will be the exchanging mutual reaction. However, taking a lowered productivity of the alloy due to its difficulty in preparation into consideration, it is practical for the crystals to have a size equal to or greater than 5 nm.

The orientation of the axes of easy magnetization of the hard phase is identified using a transmission electron micro scope (hereinafter suitably referred to as TEM) and, in the preferred embodiment, it is practically discriminated that "the orientations of the axes of easy magnetization are aligned" when the orientations of the axes of easy magnetization fall in a range of ±15°. Identification in size of the partly anisotropic regions is achieved using the TEM and, in the preferred embodiment, the size of such regions where the orientations of the axes of easy magnetization fall in the range of ±15° is defined as the size in the partly anisotropy regions. Of course, in place of observing the crystalline size using the TEM, comparative merits in characteristic of the magnet alloys may be discriminated using another effective alternative approach such as deductive inference techniques which will be described below. It may, of course, be possible for these techniques to be suitably used in combination.

In addition, the preferred embodiment concerns a technology for crushing the magnet alloy to a particle size equal to or less than that of the partly anisotropic region and using the powder enables the anisotropy to be given to the exchange spring magnet. That is, it has been confirmed that, when the magnet alloy is crushed to the particle size equal to or less than that of the partly anisotropic region, the magnetic powder formed by crushing forms a magnet having an anisotropy. During crushing operation, it has been evaluated that the magnet powder tends to be separated at interfaces between adjacent partly anisotropic regions. And, a magnetic field is imparted to the magnetic powder to cause the magnet particles to be aligned in order, thereby obtaining an aggregate (i.e. a pressed magnet powder material) of the magnet powder that is used to form the magnet having the anisotropy. Here, it is required for the partly anisotropic region to have a size equal to or greater than 0.1 μm. This is due to the fact that although the magnet alloy should be crushed to the particle size equal to or less than that of the partly anisotropic region as previously described above, the presence of the partly anisotropic region having an excessively small size causes the particles of the magnet powder produced by crushing to become too small in size with a difficulty caused in the suitable magnetic field orientation. On the one hand, the invention is not particularly limited to an upper limit of the size of the partly anisotropic region since it may be sufficient for the magnetic powder to have the size of equal to or less than that of the partly anisotropic region to be obtained by crushing. The larger the particle size is, the more preferable the magnetic field orientation will be.

Now, a detailed description will be given for a method for simply discriminating whether the rare earth magnet alloy, which is a starting material, is rendered to be partly anisotropic to satisfy a particular characteristic of the magnet alloy of the preferred embodiment according to the present invention.

One technique for discriminating the characteristic of the magnet alloy is to practically manufacture a bulk magnet and to suppose the presence of or absence of the partly anisotropic region. In particular, the magnet alloy is crushed using a ball mill to form magnet powder. The resulting magnet powder is then pressed and compacted in a magnetic field by compressing to prepare a pressed magnet powder body. The powder body is then formed into a bulk magnet through the use of a discharge plasma sintering method at a temperature equal to or less than 800° C. As to the bulk magnet, measuring magnetization curves (M-H curves wherein M is the magnetization and H is the magnetic field), which are obtained respectively in directions parallel and perpendicular to a magnetically oriented direction (the direction of the magnetic field orientation), and also comparing the measured results allow the degree of anisotropy to be revealed such that if the presence of the anisotropy is identified, then the presence of the partly anisotropic regions is presumed.

Another technique concerns a more simplified method wherein the magnet alloy (in the form of a thin strip of the rare earth alloy prepared in a strip casting method or a thin strip of the rare earth alloy having crystallites prepared by heat treating an amorphous ribbon) is crushed to a particle size equal to or less than 25 μm. The resulting powder is bonded with epoxy resin (adhesive) in the magnetic field of 10 kOe to obtain a sample of magnet to be measured by a vibration type magnetometer (VSM). And, such a resulting sample is measured with respect to the magnetization curves respectively in the directions parallel and perpendicular to the magnetically oriented direction (the direction of the magnetic field orientation) through the use of the VSM, thereby enabling the degree of the partial anisotropy to be supposed from a magnetization ratio (the degree of anisotropy) $J_{S1}$ expressed in the following formula (1), in which $M_{//}$ represents a magnitude of a magnetization in a direction parallel to the magnetically orientated direction and $M_\perp$ represents a magnitude of a magnetization in a direction perpendicular to the magnetically orientated direction. In particular, the value of the degree $J_{s1}$ of the anisotropy at the value of 16 kOe was used.

$$J_{S1}=M_{//}/M_{19S} \qquad (1)$$

With such a method, although it is preferred for the magnet alloy to be more finely crushed to a particle size equal to or less than 25 μm, upon consideration of an ease of handling during the preparation of the bonded sample and the size of the magnet powder to be crushed through the use of a mortar and to be sifted after crushing, it is preferable in actual practice for the magnet powder to have the particle size of about 25 μm. Such a technique for simply supposing the degree of the partial anisotropy is effective for exhibiting a performance especially during research and development work of the rare earth magnet. Experimentally, in a case where the starting material is composed of the rare earth magnet alloy having the result of $J_{S1}$ of a value equal to or greater than 1.1 at 16 kOe, it has been possible to prepare the anisotropic exchange spring magnet having a superior characteristic. Further, in order to pursue the characteristic of the magnet, it is preferable for the value of $J_{S1}$ at 16 kOe to be equal to or greater than 1.3, more preferable to be equal to or greater than 1.5.

By the way, a desirable magnet structure to obtain the exchange spring magnet includes alloy compositions expressed by a general formula: $Nd_xFe_{100+x+y+z}B_yV_z$ (wherein x, y, z indicate numbers: x+y+z=100). With such a structure, it has been identified from the result of X-ray diffraction analysis and analysis as to the measured results in magnetization which is temperature dependent that the hard phase definitely has a structure of $Nd_2Fe_{14}B$ and the soft phase definitely has a structure of α-Fe. Also, it is to be noted here that in the above formula in more specific, it is preferable for x=4~10, y=4~7 and z=0~2.

That is, in such a structure, more particularly, as the amount of Nd is too small, it becomes difficult to sufficiently enhance a coercive force of the exchange spring magnet and, therefore, it is preferable for such an amount of Nd to be equal to or greater than 4 atom %. On the contrary, since there are some instances where the larger the amount of Nd, the lower will be the rate to account for the soft phases with a resultant deterioration in the magnet characteristics of the exchange spring magnet, it is preferable for the amount of Nd to be equal to or less than 10 atom %.

Further, in such a structure, Pr may replace a part of Nd in the compositions in an amount of up to 0.01 to 80 atom % of Nd, more preferably from 20 to 60 atom %. Such a range experiences little remarkable deterioration in a remanence and also enables a squareness (corner sustainability) of the magnetization curve (M-H curve) and a coercive force to be highly improved.

Furthermore, in such a structure, Dy or Tb may replace a part of Nd in compositions in an amount of up to 0.01 to 10 atom % of Nd. Such a range experiences little remarkable deterioration in the remanence and also enables the coercive force to be improved while providing a capability of improving the temperature characteristic.

Moreover, in such a structure, Co may replace a part of Fe in compositions in an amount of up to 0.01 to 30 atom % of Fe, more preferably from 5 to 20 atom %. Such a range experiences no deteriorations in the coercive force and the remanence and also enables the temperature characteristic and, in addition thereto, the remanence to be improved. Also, it has been identified from the result of X-ray analysis and analysis of the measured results in magnetization which is temperature dependent that the hard phase has a structure of $Nd_2(Fe—Co)_{14}B$ and the soft phase has a structure of Fe—Co.

Further, in such a structure, Fe or Co (which appears in compositions as Fe—Co) may be substituted with a small amount of one or more elements of Al, Mo, Zr, Ti, Sn, Cu, Ga or Nb. The presence of these elements contained in the compositions promotes the formation of a finely dispersed microstructure with a resultant increase in the coercive force. On the contrary, the presence of an excessive amount of such elements contributes to deterioration in the magnetic properties. With such a view in mind, it is preferable for the amount of elements to be substituted such that the added one or more elements remain in an amount of up to 0.1 to 3 atom % of the total amount of the compositions.

Also, the presence of an extremely small amount of B contained in the compositions induces a tendency to cause a difficulty to manufacture the magnet alloy and hence it is preferable for the amount of B to be contained in a value equal to or greater than 4 atom %. In contrast, if the amount of B exceeds too much, the magnet alloy is supposed to have other phases than $Nd_2Fe_{14}B$, $Nd_2(Fe—Co)_{14}B$, α-Fe and α-(Fe—Co) with a deterioration caused in the magnet properties. As a consequence, it is preferable for the amount of B to remain in a value equal to or less than 7 atom %.

In addition, although such a structure may be added with V with a view to obtaining fine crystals and to increasing the coercive force, addition of V is not essential and may be neglected. In a case where V is added, however, if the magnet alloy contains an excessive amount of V, then the magnetic properties are adversely deteriorated and hence it is preferable for the amount of V to remain in a value equal to or less than 2 atom %.

Further, in the foregoing structure described above, since the magnet of the preferred embodiment is made of alloy materials, in an actual practice, trace amounts of impurities are inevitably present in the magnet alloy. However, the lower the amount of impurities, the higher will be the performance of the magnet alloy and hence it is preferable for the amount of impurities to be equal to or less than 1% by way of a mass.

Now, a manufacturing method for the magnet alloy of the preferred embodiment is described below in detail.

Initially, desired compositions are prepared by mixing various metallic elements, and a magnet alloy of desired compositions was fabricated by a high frequency inductive melting method in the form of a molten ingot in an atmosphere of vacuum or argon. In this connection, it may be, of course, possible for other melting techniques to be employed.

Figure 2:
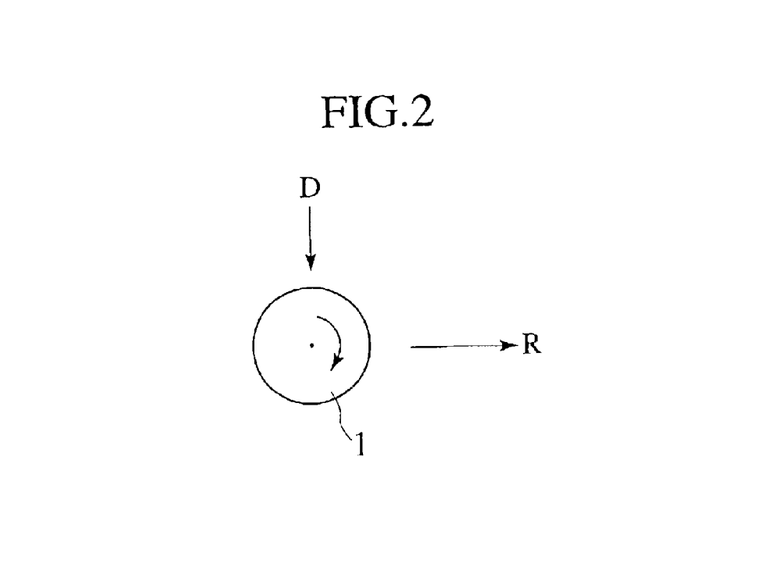
FIG. 2 is a schematic view of an ultra rapid cooling unit for producing the magnet alloy of the preferred embodiment.

Subsequently, the resulting molten mass comprised of such molten ingot is subjected to a rapid cooling step such as a strip casting method, thereby obtaining a rare earth magnet alloy in the form of an alloy thin strip. The strip casting method may be carried out, using a general unit without the need for specific improvement to be undertaken. However, of course, there is no intension to exclude a suitable improvement from being made to such method if desired. Also, the thin strip of the rare earth magnet alloy may be obtained by using an ultra rapid cooling method. In such a case, the desired compositions for the magnet alloy may be prepared by using the general unit and, more particularly, the molten mass comprised of the molten ingot is ultra rapidly cooled to form an amorphous ribbon. The resulting amorphous ribbon is then heat treated at a temperature equal to or less than 800° C. to cause the crystals to be formed, thereby enabling the formation of the thin strip of rare earth magnet alloy. As shown in FIG. 2, for example, the ultra rapid cooling is carried out by rotating a roller 1 at a high speed to which the molten mass D is continuously brought into contact and ultra rapidly cooled to form the thin strip in the form of the ribbon R. The resulting ribbon R is then heat treated to form the fine crystalline structure. Also, the number of rollers to be used may be suitably selected.

Although detailed fabricating conditions of the magnet alloy is desired to be suitably selected in accordance with the kind of the units to be used and the kind of the alloys and can not be unconditionally determined, preparation of the magnet alloy of the preferred embodiment requires a particular care for the cooling speed. More particularly, there are some instances where as the cooling speed is too high, the thin strip alloy becomes too small in thickness and as the cooling speed is too low, the thin strip alloy becomes too thick in thickness, while resulting a lack in uniformity in the thin strip alloy and in the formation of coarse crystals. Thus, when using a typical roll type cooling method, the desired cooling speed is obtained by suitably presetting a peripheral speed of the roller to be controlled. A close relationship exists between the cooling speed and the thickness of the thin strip alloy and the amorphous ribbon formed by the strip casting method and the ultra rapid cooling method and, so, it is appropriate for the thickness of the resulting thin strip alloy to be adjusted to lie in a range between from 10 to 300 μm.

While the method for manufacturing the rare earth magnet alloy having the fine crystals has been described above in connection with the strip casting method and the ultra rapid cooling method, the present invention is not intended to be limited thereto and, for example, it may be modified such that powder comprised of amorphous portions are prepared by a gas atomizing method and the resulting powder is then subjected to heat treatment to obtain a magnet alloy.

With the manufacturing method previously described above, it is possible to obtain the crystalline thin strip alloy with a crystalline size equal to or less than 80 nm. Also, although the crystalline thin strip alloy takes the form of the isotropic structure as observed in a macro-scale, the crystalline thin strip alloy may be formed with partly anisotropic region with a size equal to or greater than 0.1 μm.

That is, the rare earth magnet alloy thus formed in such a way has a feature in that it has the fine crystals. Further, a differential thermal analysis (DTA) is also conducted for the resulting rare earth magnet alloy and, as a result, a distinct thermal peak is not observed.

Also, a technique for improving the resulting magnet alloy includes a hydrogen treatment that is carried out in a manner described below.

Firstly, the magnet alloy is held in a stream of hydrogen gas under a pressure between from 0.1 to 1 atm (76 to 760 torr) for from 30 minutes to two hours. In this instance, the partial pressure of hydrogen gas may be adjusted by preparing a mixed gas containing inactive gas such as argon or may be adjusted by reducing pressure with the use of a vacuum pump. Further, if the temperature at which the magnet alloy is held remains at an excessively low level, there are some instances wherein the hydrogen treatment fails to effectively function and, if the holding temperature is too high, there are some instances wherein the coarse crystals are formed. With such a view in mind, the holding temperature may be preferably determined at a value between from 750 to 900° C. With the holding temperature remaining in such a range, the present invention is not limited to a particular temperature and may be varied to a suitable level within such temperature range in accordance with a desired situation.

Subsequently, the magnet alloy is kept under the condition where the hydrogen partial pressure is equal to or less than 1 torr while maintained the holding temperature between from 750 to 900° C. for a time interval of from 30 minutes to one hour.

Subsequently, the magnet alloy is rapidly cooled to a room temperature while maintained at the hydrogen partial pressure equal to or less than 1 torr. In this instance, if the cooling speed is too slow, it is supposed that the magnet alloy tends to absorb hydrogen, with a resultant adverse affect (such as a decrease in the anisotropy) in the magnetic characteristic. With this view in mind, it is preferable for the magnet alloy to be cooled for a time interval of from 30 minutes to one hour.

With such a hydrogen treatment, the anisotropy of the resulting magnet is improved. Further, such treatment allows the magnet alloy to be easily crushed to increase the productivity in crushing operation. Also, a device to be used in the hydrogen treatment is not limited to a particular structure provided that such hydrogen treatment is performed under various conditions previously noted above.

Next, a method for manufacturing the anisotropic exchange spring magnet, which uses the magnet alloy obtained in the manner as previously described, is explained in detail.

Firstly, the resulting rare earth magnet alloy is crushed to the powder with a particle size equal to or less than that of the partly anisotropic region. Such crushing may be preferably carried out to form the powder such that the particle size generally has a value of less than approximately 1 $\mu$m in diameter. More particularly, in case of the partly anisotropic region of the resulting magnet alloy having a size of approximately 0.5 $\mu$m, the magnet alloy is pulverized to the powder with the particle size equal to or less than 0.5 $\mu$m. Also, although the present invention is not specifically limited to a lower limit value in the particle size of the powder, as the particle size is too small, it is hard to perform the magnetic field orientation, and as the powder becomes too finely pulverized, an oxidation stability is deteriorated. With this view in mind, it is preferable for the magnet alloy to be pulverized to such extent that the particle size of the resulting powder falls in a value equal to or greater than 0.1 $\mu$m in diameter. Also, the as-milled powder has a partly amorphous portion that is presumed by measuring the magnetic properties and the X-ray diffraction characteristics.

Further, in order to pulverize the magnet alloy, various crushing machines or milling machines may be used and include a ball mill, a sand mill, a vibration mill, a jet mill, a pin mill, etc., among which the ball mill seems to be preferable from the view point of capability in milling in the order of submicron size. The ball mill may be of either a wet type or a dry type, and, in order to preclude a deterioration in the magnet properties due to oxidation of the magnet powder, it is preferable for the milling operation to be carried out in a non-oxidizing atmosphere (such as an argon atmosphere or a nitrogen atmosphere). Also, the wet type ball mill may employ cyclohexane etc. Moreover, there is a need for using a dispersant to preclude the resulting powder from aggregating, with the dispersant effectuating a desired result to the magnetic field orientation. Such a dispersant may include succinic acid for the wet type ball mill and stearic acid for the dry type ball mill.

Subsequently, the resulting magnet powder is subjected to the treatment for the magnetic field orientation and to the pressing step to obtain the compressed powder. The present invention is not limited to specific devices to be used in the treatment for the magnetic field orientation and in the pressing step, and various general treatment devices may be employed. For example, these devices may include a unit for pressing the magnet powder under a condition where the axes of easy magnetization of the magnet powder are aligned in the same direction by applying the magnetic field. When this takes place, it is appropriate for the compacting pressure to lie in a range between from 1 to 5 tons/cm$^2$ and for the magnetic field to be applied to fall in a range between from 15 to 25 kOe. Also, it is preferable for the pressed powder body to be prepared using a die assembly which is used in the discharge plasma sintering unit that will be described later, with the die assembly, containing therein the pressed powder body, being transferred to the discharge plasma sintering unit where pressure is imparted to the compacted powder to achieve the discharge plasma sintering step for thereby providing an ease of workability.

In next step, the resulting pressed powder body is subjected to a sintering step under a pressed state in a discharge plasma to obtain a bulk of the anisotropic exchange spring magnet. The use of the pressing and sintering technique in the discharge plasma enables the pressed powder body to be sintered at a relatively low temperature to preclude the formation of the coarse crystals, with a resultant magnet having excellent properties. Also, the discharge plasma pressing and sintering technique may be carried out using a general device and may be carried out with a suitably improved device depending on a final magnet to be obtained or a desired production line. In this connection, the present embodiment has used a device "Model SPS-2040" made and sold by Izumitec Co. Ltd.

In this respect, if the temperature of the discharge plasma pressing and sintering operation is too high, the coarse crystals are formed, with a tendency of resulting deteriorated coercive force and weakened exchange coupling. For this reason, it is preferable for such solidification step to be carried out at a temperature equal to or less than 800° C., more preferably equal to or less than 700° C. In contrast, if the temperature of the discharge plasma pressing and sintering operation is too low, densification of the pressed powder becomes insufficient and so the temperature of such operation is preferably maintained at a temperature equal to or higher than 600° C.

Further, such a pressing and sintering technique is preferably carried out under a reduced pressure using a rotary pump, and it is appropriate for the temperature to be raised at a rate of approximately 15 to 25 K/min. While there is a need for suitably changing the retaining time period during which the pressed powder body is treated in accordance with various factors such as the device to be employed, the operating temperature and the size of the pressed powder and it is hard for the retaining time period to be unconditionally determined, it is a usual practice for the retaining time period to be settled to a value of approximately 0 to 5 min. The pressed powder body is thus subjected to the pressing and sintering operation under such an operating temperature and such a retaining time period to promote a solidification and, thereafter, the resulting alloy is preferably cooled at a temperature lowered at a rate between approximately 10 to 30 K/min. In this instance, also, the compacting pressure for the pressing and sintering technique is appropriately selected to lie in a range between approximately 1 to 10 tons/cm$^2$.

The use of such discharge plasma pressing and sintering technique allows the bulk magnet with a low oxygen concentration to be manufactured having improved magnet properties.

Furthermore, such a discharge plasma pressing and sintering technique may be carried out in conditions, outside the previously described operating conditions, to some extents provided that there is no fear of the formation of the coarse crystals to cause the deterioration of the characteristic of the anisotropic exchange spring magnet.

Thus, the resulting bulk of the anisotropic exchange spring magnet exhibits a spring back phenomenon within second and third quadrants of the magnetization curve in a reliable manner. This is derived from the presence of the starting material comprised of the rare earth magnet alloy having the hard phase and the soft phase finely mixed with one another with respective sizes in the range from 60 to 80 nm. In this respect, it is possible to estimate the size of the exchange coupling of the resulting anisotropic exchange spring magnet by the size of the spring back.

Furthermore, it is preferable for the resulting bulk magnet to have a density close to a true density of the rare earth magnet alloy serving as the starting material from the view point of providing a higher energy product and, more particularly, to have a density of a value of 95% or more of the true density of the rare earth magnet alloy.

The anisotropic exchange spring magnet thus produced in such a manner as described above has a higher magnetic flux density than that of the Nd—Fe—B sintered magnet of the related art structure to enable a miniaturization of a motor while providing excellent temperature characteristics and de-magnetization properties. Thus, the resulting magnet is suitably applied to a drive motor of an electric vehicle or a hybrid electric vehicle. The reason why such a resulting magnet alloy has an increased flux density seems to be owing to the presence of the exchange spring magnet containing a large amount of the soft phases. The reason why the resulting magnet has such an excellent temperature characteristics seems to be based on a coercive force mechanism that is different in structure from that of the related art coercive force mechanism, that has the hard phases comprised of the crystals of a small size and that is close to a coercive force mechanism of a so-called pinning type.

Now, the anisotropic exchange spring magnet is described below as applied to a drive motor.

Figure 3:
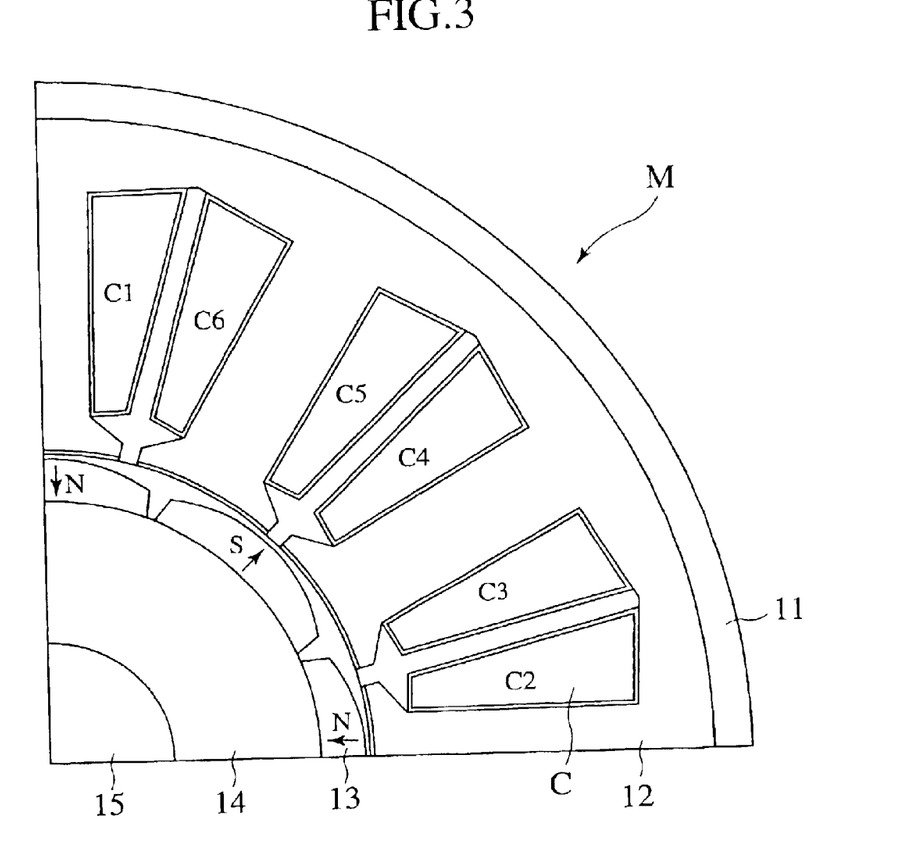
FIG. 3 is a schematic cross sectional view illustrating a quarter of a motor employing the magnet of the preferred embodiment.

FIG. 3 is a schematic cross sectional view of the drive motor M which is suitably used in an electric vehicle. Also, FIG. 3 shows only a quarter part of a total structure in cross section for the sake of convenience, with the remaining quarter parts having the similar structures.

In FIG. 3, reference numeral 11 designates a case which encloses the motor M, reference numeral 12 designates a stator serving as a stationary component part, reference numeral 14 designates a rotor that rotates in the stator 12, and reference numeral 15 designates a rotary shaft of the rotor 14. Disposed in the stator 12 are motor windings C that are sequentially located in a peripheral direction on a concentrated winding technique. The motor windings C are comprised of a u-phase C1–C2, a v-phase C3–C4 and a w-phase C5–C6. The rotor 14 has a plurality of anisotropic exchange spring magnets 13 which are mounted such that the magnetizing directions are alternately reversed. With the motor M thus structured, is referred to as a surface magnet type motor and the preferred embodiment allows the use of a structure with the stator 12 having twelve poles and the rotor 14 having eight poles.

With the structure described above, when sequentially applying exciting current to the windings of the respective phases, thereby forming magnetic fields in a sequential manner with which the magnets 13 cooperate to rotate the rotor 14 through the rotary shaft 14 of which a power output is taken out to used as a drive power for propelling the electric vehicle.

The drive motor of such a structure has a compact structure and a large power output to be produced in a highly reliable manner while maintaining a high durability.

Of course, the present invention is not limited to a particular drive motor discussed above which the anisotropic exchange spring magnet of the preferred embodiment can be applied to and may have another application to motors of the other types if desired.

Now, the magnet alloy, the magnet and the motor are described below more in detail in connection with examples and comparative examples.

EXAMPLE 1

A thin strip of an alloy was prepared in EXAMPLE 1.

A molten mass of an alloy ingot of the composition $Nd_{10}Fe_{84}B_6$ was obtained and, thereafter, an amorphous ribbon was prepared having a width of 3 mm and a thickness of 30 μm using the roller type ultra rapid cooling device shown in FIG. 2. The ribbon produced was heat treated to obtain a thin strip of the alloy. The ultra rapid cooling was carried out at a rotor peripheral speed of 20 m/sec, and the heat treating was carried out at a temperature of 650° C. for five minutes in a vacuum.

When observed the cut-away section of the resulting thin strip of the alloy with SEM, the thin strip of the alloy revealed the presence of mixture of the hard phase, with the size equal to or less than 70 nm, and the soft phase, with the size equal to or less than 70 nm. Also, the size of the partly anisotropic region observed by TEM fell in a range from 0.3 to 1.0 μm.

A discrimination was conducted with respect to comparative merits of the resulting thin strip alloy by preparing a VSM sample in a sequence discussed below, and it was judged that when the result of $J_{S1}$ showing a value equal to or larger than 1.1, the thin strip was "excellent". This was based in light of the fact that, when using the material having the result of $J_{S1}$ showing the value equal to or larger than 1.1, it was possible to prepare the anisotropic bulk exchange spring magnet with superior properties.

Preparation of the VSM sample of the preferred embodiment and a method of evaluating the value of $J_{S1}$ are performed in a manner as described below.

The resulting thin strip alloy was pulverized to powder with the particle size equal to or less than 25 μm using the mortar. The powder produced was bonded with epoxy resin in the magnetic field of 10 kOe, thereby obtaining the VSM sample. By using the vibration type magnetometer having the maximum magnetic field of 16 kOe (i.e. Model VSM-5-15 manufactured by Toeikogyo Co. Ltd.), the magnetization curve in a direction parallel to the magnetically oriented direction and the magnetization curve in a direction perpendicular to the magnetically oriented direction were measured to find out the result $J_{S1}$ of the foregoing formula (1), and it was estimated that the result $J_{S1}$ was 1.7.

The result of EXAMPLE 1 was indicated in Table 1, by which it was confirmed that the thin strip of alloy suited as material for the anisotropic exchange spring magnet was obtained in this EXAMPLE.

EXAMPLE 2

In EXAMPLE 2, a thin strip of alloy of the composition $Nd_8Fe_{86}B_6$ was obtained in the same procedure of EXAMPLE 1 except for the ultra rapid cooling condition at the roller peripheral speed of 25 m/sec.

When observed the cut-away section of the resulting thin strip alloy with SEM, the thin strip of alloy revealed the presence of mixture of the hard phase, with the size equal to or less than 80 nm, and the soft phase, with the size equal to or less than 80 nm. Also, the size of the partly anisotropic region observed by TEM fell in a range from 0.2 to 0.6 μm. The VSM sample was prepared in the same procedure of EXAMPLE 1, and evaluation was conducted for the result of $J_{S1}$ that was revealed to be 1.55. Also, the VSM sample had the coercive force of 5.8 kOe.

The result of this EXAMPLE was indicated in Table 1, by which it was also confirmed that the thin strip of alloy suited as material for the anisotropic exchange spring magnet was obtained in this EXAMPLE.

EXAMPLE 3

In EXAMPLE 3, a thin strip of alloy of the composition $Nd_6Fe_{88}B_6$ was obtained in the same procedure of EXAMPLE 1 except for the ultra rapid cooling condition at the roller peripheral speed of 30 m/sec.

When observed the cut-away section of the resulting thin strip alloy with SEM, the thin strip of alloy revealed the presence of mixture of the hard phase, with the size equal to or less than 80 nm, and the soft phase, with the size equal to or less than 80 nm. Also, the size of the partly anisotropic region observed by TEM fell in a range from 0.1 to 0.5 μm. The VSM sample was prepared in the same procedure of EXAMPLE 1, and evaluation was conducted for the result of $J_{S1}$ that was revealed to be 1.4.

The result of this EXAMPLE was indicated in Table 1, by which it was also confirmed that the thin strip of alloy suited as material for the anisotropic exchange spring magnet was obtained in this EXAMPLE.

EXAMPLE 4

In EXAMPLE 4, a thin strip of an alloy of the composition $Nd_4Fe_{90}B_6$ was obtained in the same procedure of EXAMPLE 1 except for the ultra rapid cooling condition at the roller peripheral speed of 40 m/sec.

When observed the cut-away section of the resulting thin strip of alloy with SEM, the thin strip of alloy revealed the presence of mixture of the hard phase, with the size equal to or less than 80 nm, and the soft phase, with the size equal to or less than 80 nm. Also, the size of the partly anisotropic region observed by TEM fell in a range from 0.1 to 0.4 μm. The VSM sample was prepared in the same procedure of EXAMPLE 1, and evaluation was conducted for the result of $J_{S1}$ that was revealed to be 1.35.

The result of this EXAMPLE was indicated in Table 1, by which it was also confirmed that the thin strip of alloy suited as material for the anisotropic exchange spring magnet was obtained in this EXAMPLE.

COMPARATIVE EXAMPLE 1

In COMPARATIVE EXAMPLE 1, a thin strip of alloy was obtained in the same procedure of EXAMPLE 2 except for the same ultra rapid cooling condition as in EXAMPLE 1.

When observed the cut-away section of the resulting thin strip of the alloy with SEM, the thin strip of the alloy revealed the presence of mixture of the hard phase, with the size equal to or less than 100 nm, and the soft phase, with the size equal to or less than 100 nm. Also, the size of the partly anisotropic region was observed by TEM but the presence of the partly anisotropic region was not confirmed. The VSM sample was prepared in the same procedure of EXAMPLE 1, and evaluation was conducted for the result of $J_{S1}$ that was revealed to be 1.05.

The result of this COMPARATIVE EXAMPLE was indicated in Table 1, by which it was confirmed that the resulting thin strip of alloy had a large crystalline size with the absence of the partly anisotropic region and had a lower value of $J_{S1}$ whereby the resulting thin strip of alloy was not suited as material for the anisotropic exchange spring magnet as compared with those of EXAMPLES 1 to 4

TABLE 1

| | Composition (atom %) | Size of Hard Phase (nm) | Size of Soft Phase (nm) | Size of Partly Anisotropic Region (μm) | $J_{S1}$ |
| --- | --- | --- | --- | --- | --- |
| EXAMPLE 1 | $Nd_{10}Fe_{84}B_6$ | 40–70 | 40–70 | 0.3–1.0 | 1.7 |
| EXAMPLE 2 | $Nd_8Fe_{86}B_6$ | 40–80 | 40–80 | 0.2–0.6 | 1.55 |
| EXAMPLE 3 | $Nd_6Fe_{88}B_6$ | 40–80 | 40–80 | 0.1–0.5 | 1.4 |
| EXAMPLE 4 | $Nd_4Fe_{90}B_6$ | 50–80 | 50–80 | 0.1–0.4 | 1.35 |
| COMPAR. EXAMPLE 1 | $Nd_8Fe_{86}B_6$ | 50–100 | 50–100 | — | 1.05 |

It appears from Table 1 that, in EXAMPLES 1 to 4, the resulting thin strips of alloy had suitably small crystalline sizes with the presence of the partly anisotropic region in suitable sizes while having suitable values of $J_{S1}$ and were suited as materials for the anisotropic exchange spring magnet. On the contrary, as seen from COMPARATIVE EXAMPLE 1, it appears that the resulting thin strip of alloy had the large crystalline size with the absence of the partly anisotropic region and had the lower value of $J_{S1}$ whereby the resulting thin strip of alloy was not suited as material for the anisotropic exchange spring magnet as compared with those of EXAMPLES 1 to 4.

EXAMPLE 5

In EXAMPLE 5, a thin strip of an alloy was obtained in the same procedure of EXAMPLE 2 except for the alloy being comprised of the composition $Nd_8Fe_{85}B_7$.

When observed the cut-away section of the resulting thin strip of the alloy with SEM, the thin strip of the alloy revealed the presence of mixture of the hard phase, with the size equal to or less than 80 nm, and the soft phase, with the size equal to or less than 80 nm. Also, the size of the partly anisotropic region observed by TEM fell in a range from 0.2 to 0.6 μm. The VSM sample was prepared in the same procedure of EXAMPLE 1, and evaluation was conducted for the result of $J_{S1}$ that was revealed to be 1.6. The thin strip had the coercive force of 5.8 kOe.

The result of this EXAMPLE was indicated in Table 2, by which it was also confirmed that the thin strip of alloy suited as material for the anisotropic exchange spring magnet was obtained in this EXAMPLE.

EXAMPLE 6

In EXAMPLE 6, a thin strip of an alloy was obtained in the same procedure of EXAMPLE 2 except for the alloy being comprised of the composition $Nd_8Fe_{85}B_6V_1$.

When observed the cut-away section of the resulting thin strip of the alloy with SEM, the thin strip of the alloy revealed the presence of mixture of the hard phase, with the size equal to or less than 40 nm, and the soft phase, with the size equal to or less than 40 nm. Also, the size of the partly anisotropic region observed by TEM fell in a range from 0.2 to 0.6 μm. The VSM sample was prepared in the same procedure of EXAMPLE 1, and evaluation was conducted for the result of $J_{S1}$ that was revealed to be 1.6. The thin strip had the coercive force of 9.8 kOe.

The result of this EXAMPLE was indicated in Table 2, by which it was also confirmed that the thin strip of alloy suited as material for the anisotropic exchange spring magnet was obtained in this EXAMPLE.

EXAMPLE 7

In EXAMPLE 7, a thin strip of an alloy was obtained in the same procedure of EXAMPLE 2 except for the alloy being comprised of the composition $Nd_8Fe_{88}B_4$.

When observed the cut-away section of the resulting thin strip of the alloy with SEM, the thin strip of the alloy revealed the presence of mixture of the hard phase, with the size equal to or less than 40 nm, and the soft phase, with the size equal to or less than 40 nm. Also, the size of the partly anisotropic region observed by TEM fell in a range from 0.2 to 0.6 μm. The VSM sample was prepared in the same procedure of EXAMPLE 1, and evaluation was conducted for the result of $J_{S1}$ that was revealed to be 1.55. The thin strip had the coercive force of 3.4 kOe.

The result of this EXAMPLE was indicated in Table 2, by which it was also confirmed that the thin strip of alloy suited as material for the anisotropic exchange spring magnet was obtained in this EXAMPLE.

EXAMPLE 8

In EXAMPLE 8, a thin strip of an alloy was obtained in the same procedure of EXAMPLE 2 except for the alloy being comprised of the composition $Nd_8Fe_{86}B_4V_2$.

When observed the cut-away section of the resulting thin strip of the alloy with SEM, the thin strip of the alloy revealed the presence of mixture of the hard phase, with the size equal to or less than 40 nm, and the soft phase, with the size equal to or less than 40 nm. Also, the size of the partly anisotropic region observed by TEM fell in a range from 0.2 to 0.6 μm. The VSM sample was prepared in the same procedure of EXAMPLE 1, and evaluation was conducted for the result of $J_{S1}$ that was revealed to be 1.6. The thin strip had the coercive force of 4.3 kOe.

The result of this EXAMPLE was indicated in Table 2, by which it was also confirmed that the thin strip of alloy suited as material for the anisotropic exchange spring magnet was obtained in this EXAMPLE.

COMPARATIVE EXAMPLE 2

In COMPARATIVE EXAMPLE 2, a thin strip of an alloy was obtained in the same procedure of EXAMPLE 2 except for the alloy ingot being comprised of the composition $Nd_8Fe_{89}B_3$.

When observed the cut-away section of the resulting thin strip of the alloy with SEM, the thin strip of the alloy revealed the presence of mixture of the hard phases, with the size equal to or less than 80 nm, and the soft phase, with the size equal to or less than 80 nm. Also, the size of the partly anisotropic region was observed by TEM but the presence of the partly anisotropic regions was not confirmed. The VSM sample was prepared in the same procedure of EXAMPLE 1, and evaluation was conducted for the result of $J_{S1}$ that was revealed to be 1.05.

The result of this COMPARATIVE EXAMPLE was indicated in Table 2, by which it was confirmed that the partly anisotropic region was absent in the resulting thin strip of alloy which also had a lower value of $J_{S1}$ whereby the resulting thin strip of alloy was not suited as material for the anisotropic exchange spring magnet as compared with those of EXAMPLES 5 to 8.

TABLE 2

|  | Composition (atom %) | Size of Hard Phase (nm) | Size of Soft Phase (nm) | Size of Partly Anisotropic Region (μm) | $J_{S1}$ |
| --- | --- | --- | --- | --- | --- |
| EXAMPLE 2 | $Nd_8Fe_{86}B_6$ | 40–80 | 40–80 | 0.2–0.6 | 1.55 |
| EXAMPLE 5 | $Nd_8Fe_{85}B_7$ | 40–80 | 40–80 | 0.2–0.6 | 1.6 |
| EXAMPLE 6 | $Nd_8Fe_{85}B_6V_1$ | 15–40 | 15–40 | 0.2–0.6 | 1.6 |
| EXAMPLE 7 | $Nd_8Fe_{88}B_4$ | 15–40 | 15–40 | 0.2–0.6 | 1.55 |
| EXAMPLE 8 | $Nd_8Fe_{85}B_4V_2$ | 15–40 | 15–40 | 0.2–0.6 | 1.6 |
| COMPAR. EXAMPLE 2 | $Nd_8Fe_{89}B_3$ | 40–80 | 40–80 | — | 1.05 |

As shown in Table 2, it appears that, in EXAMPLES 5 to 8, the resulting thin strips of alloy can be estimated that they had the excellent properties as materials for the anisotropic exchange spring magnet, and more in detail, in EXAMPLES 6 and 8, each coercive force was effectively increased by adding V.

On the contrary, as seen from COMPARATIVE EXAMPLE 2, it appears that the resulting thin strip of alloy had no partly anisotropic region and had the lower value of $J_{S1}$ whereby the resulting thin strip of alloy was not suited as material for the anisotropic exchange spring magnet as compared with those of EXAMPLES 5 to 8. Further, in these Examples, each coercive force can be increased by adding Ti, Zr or Nb other than V.

Incidentally, it is noted that in EXAMPLE 5, when a sample was prepared with B concentration at 8 atom %, a phenomenon such as a precipitation of B compound was observed.

In addition in Table 2, the result of EXAMPLE 2 was inserted as a reference.

EXAMPLE 9

In EXAMPLE 9, an alloy ingot comprised of the compositions $Nd_9Fe_{76}Co_8B_6Co_8V_1$ was used to prepare a thin strip of an alloy using the strip casting method. The strip casting method was carried out under a condition wherein the thin strip was solidified at a temperature of 880~920° C. and cooling was carried out at a cooling speed rate of approximately 2500° C./sec.

When observed the cut-away section of the resulting thin strip of the alloy with SEM, the thin strip of the alloy revealed the presence of mixture of the hard phase, with the size equal to or less than 40 nm, and the soft phase, with the size equal to or less than 40 nm. Also, the size of the partly anisotropic region observed by TEM fell in a range from 0.3 to 0.8 μm. The VSM sample was prepared in the same procedure of EXAMPLE 1, and evaluation was conducted for the result of $J_{S1}$ that was revealed to be 1.7.

The result of this EXAMPLE was indicated in Table 3, by which it was also confirmed that the thin strip of alloy suited as material for the anisotropic exchange spring magnet was obtained in this EXAMPLE.

EXAMPLE 10

In EXAMPLE 10, an alloy ingot comprised of the compositions $Nd_{10}Fe_{75}Co_8B_6V_1$ was used to prepare a thin strip of an alloy in the same procedure of EXAMPLE 9 with the exception in that the strip casting method was carried out at the cooling speed rate of approximately 2200° C./sec.

When observed the cut-away section of the resulting thin strip of the alloy with SEM, the thin strip of the alloy revealed the presence of mixture of the hard phase, with the size equal to or less than 40 nm, and the soft phase, with the size equal to or less than 40 nm. Also, the size of the partly anisotropic region observed by TEM fell in a range from 0.3 to 1.0 μm. The VSM sample was prepared in the same procedure of EXAMPLE 1, and evaluation was conducted for the result of $J_{S1}$ that was revealed to be 1.8.

The result of this EXAMPLE was indicated in Table 3, by which it was also confirmed that the thin strip of alloy suited as material for the anisotropic exchange spring magnet was obtained in this EXAMPLE.

EXAMPLE 11

In EXAMPLE 11, an alloy ingot comprised of the compositions $Nd_7Fe_{78}Co_8B_6V_1$ was used to prepare a thin strip of an alloy in the same procedure of EXAMPLE 9 with the exception in that the strip casting method was carried out at the cooling speed rate of approximately 3000° C./sec.

When observed the cut-away section of the resulting thin strip of the alloy with SEM, the thin strip of the alloy revealed the presence of mixture of the hard phase, with the size equal to or less than 50 nm, and the soft phase, with the size equal to or less than 50 nm. Also, the size of the partly anisotropic region observed by TEM fell in a range from 0.2 to 0.6 μm. The VSM sample was prepared in the same procedure of EXAMPLE 1, and evaluation was conducted for the result of $J_{S1}$ that was revealed to be 1.6.

The result of this EXAMPLE was indicated in Table 3, by which it was also confirmed that the thin strip of alloy suited as material for the anisotropic exchange spring magnet was obtained in this EXAMPLE.

EXAMPLE 12

In EXAMPLE 12, an alloy ingot comprised of the compositions $Nd_6Fe_{79}Co_8B_6V_1$ was used to prepare a thin strip of an alloy in the same procedure of EXAMPLE 9 with the exception in that the strip casting method was carried out at the cooling speed rate of approximately 4000° C./sec.

When observed the cut-away section of the resulting thin strip of the alloy with SEM, the thin strip of the alloy revealed the presence of mixture of the hard phase, with the size equal to or less than 50 nm, and the soft phase, with the size equal to or less than 50 nm. Also, the size of the partly anisotropic region observed by TEM fell in a range from 0.1 to 0.5 μm. The VSM sample was prepared in the same procedure of EXAMPLE 1, and evaluation was conducted for the result of $J_{S1}$ that was revealed to be 1.5.

The result of this EXAMPLE was indicated in Table 3, by which it was also confirmed that the thin strip of alloy suited as material for the anisotropic exchange spring magnet was obtained in this EXAMPLE.

EXAMPLE 13

In EXAMPLE 13, an alloy ingot comprised of the compositions $Nd_4Fe_{81}Co_8B_6V_1$ was used to prepare a thin strip of an alloy in the same procedure of EXAMPLE 9 with the exception in that the strip casting method was carried out at the cooling speed rate of approximately 5000° C./sec.

When observed the cut-away section of the resulting thin strip of the alloy with SEM, the thin strip of the alloy revealed the presence of mixture of the hard phase, with the size equal to or less than 60 nm, and the soft phase, with the size equal to or less than 60 nm. Also, the size of the partly anisotropic region observed by TEM fell in a range from 0.1 to 0.5 μm. The VSM sample was prepared in the same procedure of EXAMPLE 1, and evaluation was conducted for the result of $J_{S1}$ that was revealed to be 1.45.

The result of this EXAMPLE was indicated in Table 3, by which it was also confirmed that the thin strip of alloy suited as material for the anisotropic exchange spring magnet was obtained in this EXAMPLE.

COMPARATIVE EXAMPLE 3

In COMPARATIVE EXAMPLE 3, a thin strip of an alloy was obtained in the same procedure of EXAMPLE 9 except for an alloy ingot produced being comprised of the compositions $Nd_6Fe_{79}Co_8B_6V_1$.

When observed the cut-away section of the resulting thin strip of the alloy with SEM, the thin strip of the alloy revealed the presence of mixture of the hard phase, with the size equal to or less than 200 nm, and the soft phase, with the size equal to or less than 200 nm. Also, upon observation of the thin strip with TEM, the presence of the partly anisotropic region was not confirmed. The VSM sample was prepared in the same procedure of EXAMPLE 1, and evaluation was conducted for the result of $J_{S1}$ that was revealed to be 1.05.

The result of this COMPARATIVE EXAMPLE was indicated in Table 3, by which it was confirmed that the thin strip of alloy produced was not suited as material for the anisotropic exchange spring magnet as compared to those of EXAMPLES 9 to 13.

TABLE 3

| | Composition (atom%) | Size of Hard Phase (nm) | Size of Soft Phase (nm) | Size of Partly Anisotropic Region (μm) | $J_{S1}$ |
|---|---|---|---|---|---|
| EXAMPLE 9 | $Nd_9Fe_{76}Co_8B_6V_1$ | 15–40 | 15–40 | 0.3–0.8 | 1.7 |
| EXAMPLE 10 | $Nd_{10}Fe_{75}Co_8B_6V_1$ | 15–40 | 15–40 | 0.3–1.0 | 1.8 |
| EXAMPLE 11 | $Nd_7Fe_{78}Co_8B_6V_1$ | 25–50 | 25–50 | 0.2–0.6 | 1.6 |
| EXAMPLE 12 | $Nd_6Fe_{79}Co_8B_6V_1$ | 30–50 | 30–50 | 0.1–0.5 | 1.5 |
| EXAMPLE 13 | $Nd_4Fe_{81}Co_8B_6V_1$ | 40–60 | 40–60 | 0.1–0.5 | 1.45 |
| COMPAR. EXAMPLE 3 | $Nd_6Fe_{79}Co_8B_6V_1$ | 100–200 | 100–200 | — | 1.05 |

As shown in Table 3, it appears that the resulting thin strips of alloy obtained in EXAMPLES 9 to 13 were suited as materials for the anisotropic exchange spring magnet. On the contrary, as seen from COMPARATIVE EXAMPLE 3, it appears that the resulting thin strip of alloy had the large crystalline size with the absence of the partly anisotropic region and had the lower value of $J_{S1}$ whereby the resulting thin strip of alloy was not suited as material for the anisotropic exchange spring magnet. Also, it will be appreciated from the above EXAMPLES and COMPARATIVE EXAMPLE that as the amount of Nd decreases, the crystalline size tends to increase.

EXAMPLE 14

In EXAMPLE 14, an alloy ingot comprised of the compositions $Nd_7Fe_{78}Co_8B_6V_1$ was used to prepare a thin strip of an alloy in the same procedure of EXAMPLE 1 with the exception in that the ultra rapid cooling was carried out at a roller peripheral speed of 30 m/sec.

When observed the cut-away section of the resulting thin strip of the alloy with SEM, the thin strip of the alloy revealed the presence of mixture of the hard phase, with the size equal to or less than 50 nm, and the soft phase, with the size equal to or less than 50 nm. Also, the size of the partly anisotropic region observed by TEM fell in a range from 0.2 to 0.6 μm. The VSM sample was prepared in the same procedure of EXAMPLE 1, and evaluation was conducted for the result of $J_{S1}$ that was revealed to be 1.6.

The result of this EXAMPLE was indicated in Table 4, by which it was also confirmed that the thin strip of alloy suited as material for the anisotropic exchange spring magnet was obtained in this EXAMPLE.

EXAMPLE 15

In EXAMPLE 15, an alloy ingot comprised of the compositions $Nd_6Fe_{79}Co_8B_6V_1$ was used to prepare a thin strip of an alloy in the same procedure of EXAMPLE 1 with the exception in that the ultra rapid cooling was carried out at a roller peripheral speed of 40 m/sec.

When observed the cut-away section of the resulting thin strip of the alloy with SEM, the thin strip of the alloy revealed the presence of mixture of the hard phase, with the size equal to or less than 50 nm, and the soft phase, with the size equal to or less than 50 nm. Also, the size of the partly anisotropic region observed by TEM fell in a range from 0.1 to 0.5 μm. The VSM sample was prepared in the same procedure of EXAMPLE 1, and evaluation was conducted for the result of $J_{S1}$ that was revealed to be 1.5.

The result of this EXAMPLE was indicated in Table 4, by which it was also confirmed that the thin strip of alloy suited as material for the anisotropic exchange spring magnet was obtained in this EXAMPLE.

COMPARATIVE EXAMPLE 4

In COMPARATIVE EXAMPLE 4, a thin strip of an alloy was obtained in the same procedure of EXAMPLE 14 except for the alloy ingot produced being comprised of the compositions $Nd_6Fe_{79}Co_8B_6V_1$.

When observed the cut-away section of the resulting thin strip of the alloy with SEM, the thin strip of the alloy revealed the presence of mixture of the hard phase, with the size equal to or less than 100 nm, and the soft phase, with the size equal to or less than 100 nm. Also, upon observation of the thin strip with TEM, the presence of the partly anisotropic region was not confirmed. The VSM sample was prepared in the same procedure of EXAMPLE 1, and evaluation was conducted for the result of $J_{S1}$ that was revealed to be 1.05.

The result of this COMPARATIVE EXAMPLE was indicated in Table 4, by which it was confirmed that the resulting thin strip had a large crystalline size and a small value of $J_{S1}$ in the absence of the partly anisotropic region and was not suited as material for the anisotropic exchange spring magnet as compared to those of EXAMPLES 14 and 15.

TABLE 4

| | Composition (atom %) | Size of Hard Phase (nm) | Size of Soft Phase (nm) | Size of Partly Anisotropic Region (μm) | $J_{S1}$ |
|---|---|---|---|---|---|
| EXAMPLE 14 | $Nd_7Fe_{78}Co_8B_6V_1$ | 25–50 | 25–50 | 0.2–0.6 | 1.6 |
| EXAMPLE 15 | $Nd_6Fe_{79}Co_8B_6V_1$ | 30–50 | 30–50 | 0.1–0.5 | 1.5 |
| COMPAR. EXAMPLE 4 | $Nd_6Fe_{79}Co_8B_6V_1$ | 60–100 | 60–100 | — | 1.05 |

As shown in Table 4, it appears that the resulting thin strips of alloy obtained in EXAMPLES 14 and 15 were suited as materials for the anisotropic exchange spring magnet. On the contrary, as seen from COMPARATIVE EXAMPLE 4, it appears that the resulting thin strip of alloy had the large crystalline size in the absence of the partly anisotropic region and had the lower value of $J_{S1}$ whereby the resulting thin strip of alloy was not suited as material for the anisotropic exchange spring magnet.

EXAMPLE 16

In EXAMPLE 16, the thin strip of alloy obtained in EXAMPLE 9 was crushed using the wet type ball mill in an atmosphere of argon through the use of cyclohexane. Crushing was carried out using the dispersant such as Polybutenyl succinimide tetraethylenepentamine (molecular weight 1300) containing a slight amount of mineral oil. When observed the size of the resulting powder using SEM, it was confirmed that the resulting powder had the size of less than 1 μm with no particles in size equal to or greater than 1 μm.

Subsequently, the resulting powder was placed in the magnetic field of 20 kOe to be magnetically orientated, i.e. to carry out the magnetic field orientation, and then the resulting powder was pressed at a pressure of 2 tons/cm² to obtain the pressed powder body.

In next step, the resulting compressed powder body was subjected to the discharge plasma sintering process at a pressure of 9 tons/cm² and at a die temperature of 650° C. for three minutes using the discharge plasma sintering unit (Model SPS-2040 manufactured by Izumitec Co. Ltd.), thereby obtaining a bulk of exchange spring magnet. During such a sintering operation, a die assembly used by the unit was a non-magnetic WC die and the sintering operation was carried out under a reduced pressure using the rotary pump. Also, the temperature rise speed was controlled at 20 K/min.

The resulting exchange spring magnet in the bulk form had a dimension of 10 mm×10 mm×7 mm, and the density of the magnet reached a true density of the thin strip of alloy. When observed the resulting magnet with TEM, it was confirmed that the crystalline size was 15 to 40 nm. Also, by analyzing an electron beam diffraction pattern of the magnet, it was confirmed that the axes of easy magnetization of the hard phases are aligned in the same direction. And also, when tried to observe the cross section of the magnet with SEM, the resulting magnet was likely to have a structure such that discrimination for the original powder shapes was mostly difficult.

The magnetization curve of the resulting exchange spring magnet in the form of bulk was measured using the B—H tracer having the maximum magnetic field of 20 kOe (with the use of direct current), thereby obtaining $J_{S2}$ as expressed by the following formula (2), in which $M_{//}'$ represents a magnitude of a magnetization, which is the value measured by the B—H tracer at 20 kOe, in a direction parallel to the magnetically oriented direction (the direction magnetic field orientation) and $M_\perp$ represents a magnitude of a magnetization, which is the value measured by the B—H tracer at 20 kOe, in a direction perpendicular to the magnetically oriented direction (the direction of the magnetic field orientation).

$$J_{S2}=M_{||}'/M_\perp' \qquad (2)$$

By using the above formula, the resulting $J_{S2}$ is 1.8, and it is understood that the presence of the magnet in the bulk form produced by the discharge plasma sintering unit allows it to have a higher anisotropic property than the resulting thin strip of alloy produced in EXAMPLE 9. Also, calculating the maximum energy product of the resulting magnet from the magnetization curve reached a value of 25 MGOe. Further, the resulting magnet had the coercive force of approximately 7.0 kOe.

The result of this EXAMPLE is dictated in Table 5, from which it was confirmed that the exchange spring magnet present in a sufficient anisotropy while having a large value in the maximum energy product was obtained.

EXAMPLE 17

In EXAMPLE 17, the exchange spring magnet in the form of bulk was obtained in the same procedure of EXAMPLE 16 except for the sintering being carried out at a compressing pressure of 8 tons/cm².

The resulting magnet had a density of 95% of the true density of the thin strip of alloy. When evaluated the value of $J_{S2}$ of the resulting magnet, the result was 1.8. The resulting magnet also had the energy product of 20 MGOe. Moreover, the resulting magnet had the coercive force of approximately 7.0 kOe.

The result of this EXAMPLE was shown in Table 5 and, in this EXAMPLE, it was confirmed that the resulting exchange spring magnet having a sufficient anisotropy while having a large maximum energy product was obtained.

COMPARATIVE EXAMPLE 5

In COMPARATIVE EXAMPLE 5, the exchange spring magnet in the form of bulk was obtained in the same procedure of EXAMPLE 16 except for the sintering being carried out at a compressing pressure of 7 tons/cm².

The resulting magnet had a density of 90% of the true density of the thin strip of alloy. When evaluated the value of $J_{S2}$ of the resulting magnet, the result was 1.8. The resulting magnet also had the energy product of 18 MGOe. Moreover, the resulting magnet had the coercive force of approximately 7.0 kOe.

The result of this COMPARATIVE EXAMPLE was shown in Table 5 and, in this COMPARATIVE EXAMPLE, it was confirmed that the resulting exchange spring magnet having a sufficient anisotropy while having a small maximum energy product was obtained.

COMPARATIVE EXAMPLE 6

In COMPARATIVE EXAMPLE 6, the exchange spring magnet in the form of bulk was obtained in the same procedure of EXAMPLE 16 except for the sintering being carried out at a temperature of 810° C.

The resulting magnet reached the true density of the thin strip of alloy. When evaluated the value of $J_{S2}$ of the resulting magnet, the result was 1.5. The resulting magnet also had the energy product of 15 MGOe. Moreover, the resulting magnet had the coercive force of approximately 5.0 kOe.

The result of this COMPARATIVE EXAMPLE was shown in Table 5 and, in this COMPARATIVE EXAMPLE, it was confirmed that the resulting exchange spring magnet having a sufficient anisotropy while having a small maximum energy product was obtained.

TABLE 5

|  | Composition (atom %) | $J_{S2}$ | BH max (MGOe) |
| --- | --- | --- | --- |
| EXAMPLE 16 | $Nd_9Fe_{76}Co_8B_6V_1$ | 1.8 | 25 |
| EXAMPLE 17 | $Nd_9Fe_{76}Co_8B_6V_1$ | 1.8 | 20 |
| COMPAR. EXAMPLE 5 | $Nd_9Fe_{76}Co_8B_6V_1$ | 1.8 | 18 |
| COMPAR. EXAMPLE 6 | $Nd_9Fe_{76}Co_8B_6V_1$ | 1.5 | 15 |

As shown in Table 5, while it appears that the resulting magnets obtained in EXAMPLES 16 and 17 have excellent properties such as sufficient energy products, this seems to be derived from a reason wherein the magnet density was equal to 95% or more of the true density of the starting material forming the alloy and the discharge plasma sintering unit was run at the sintering temperature equal to or less than 800° C.

EXAMPLE 18

In EXAMPLE 18, the exchange spring magnet of EXAMPLE 16 was applied to the surface magnet type motor (with the stator of 12 poles and the rotor of 8 poles) of the concentrated winding type shown in FIG. 3.

In FIG. 3, the motor M included the aluminum case 11 located at the outside and the stator (with an inner diameter of 52 mm and an outer diameter of 108 mm) 12 having the winding C located inside, with the winding C being comprised of u-phase winding elements C1–C2, the v-phase winding elements C3–C4 and the w-phase winding elements C5–C6. Also, the stator 12 was a laminated structure of electrical steel sheets. The magnets 13 formed in shapes shown in FIG. 3 were located on an outer periphery of an iron rotor 14 such that the magnetic polarities were alternately reversed in sequence. Also, the rotor 14 had an outermost diameter 50.7 mm and the stator 12 and the rotor 14 had a value of 79.8 mm in thickness.

The motor M thus constructed has a performance of a maximum rating of 2 kW and a heat-resistance limiting of 160° C. A coercive force of the magnet was 7.2 kOe. On the contrary, in case of the motor comprised of the related art Nd—Fe—B type sintered magnet, it was necessary for the motor to use the magnet with the coercive force of 19.8 kOe or more in order to enhance an equal heat-resistance property.

Accordingly, the motor of the presently filed preferred embodiment exhibits a wide significance present especially in thermal design of the motor in a simplified structure having excellent heat-resistance in property while having a high power output.

According to the present invention, with the structure described above, an ease of manufacturing is provided to manufacture the anisotropic bulk exchange spring magnet. The magnet is anisotropic and has a large energy product, with a resultant capability in decreasing the amount of the rare earth metals.

Further, since the magnet has the compositions of $Nd_xFe_{100-x-y-z}B_yV_z$ (x=4~10, y=4~7 and z=0~2), it is possible to increase the coercive force of the magnet and its productivity.

Furthermore, the replacement of a part of Nd by Pr in the magnet alloy compositions generally results in an improvement in the coercive force and the squareness while precluding a decrease in the remanence of the magnet.

Moreover, the replacement of a part of Nd by Dy or Tb in the magnet alloy compositions generally results in an improvement in the coercive force and the temperature characteristic while precluding a decrease in the remanence of the magnet.

Further, the replacement of a part of Fe by Co in the magnet alloy compositions generally results in an improvement in the temperature characteristic and the remanence of the magnet.

Furthermore, the replacement of a part of Fe or Co by at least one kind of Al, Mo, Zr, Ti, Sn, Cu, Ga or Nb in the magnet alloy compositions generally results in an improvement in the formation of the finely crystalline microstructures that result in an increase in the coercive force.

In addition, the presence of the hard magnetic phases and the soft magnetic phases each formed in size equal to or less than 60 nm enables realization of further increase in the coercive force.

Further, the use of the rare earth magnet alloy having a large degree of anisotropy is effective to provide the anisotropic exchange spring magnet having excellent magnetic properties.

Furthermore, the use of the strip casting method or the ultra rapid cooling method ensures the rare earth magnet alloy to be obtained, and preparation of the thin strip of crystalline alloy with a thickness adjusted to have a value between from 10 to 300 $\mu m$ enables the production of the alloy thin strip having the fine crystals.

Besides, compressing and sintering the magnet alloy in the discharge plasma after the pulverizing operation enables the production of the bulk exchange spring magnet having the anisotropy wherein the fine crystalline particles are maintained. As a consequence, the resulting exchange spring magnet has further excellent magnet properties. Further, the presence of the bulk magnet with the density of a value equal to or greater than 95% of the true density of the rare earth magnet alloy enables the magnet produced to have a preferable energy product.

Further, the motor, which employs the exchange spring magnet having such an excellent magnetic property, can be manufactured in small size and in light weight resulting in an improved efficiency of the motor as well as reduction in production cost. Also, since the motor has superior resistance in high temperature, an excellent advantage is obtained in thermal design.

Accordingly, in a case where the resulting magnet is applied to the drive motor of various applications such as the electric vehicle, the presence of the miniaturization and light weight of the motor largely contributes to improvement in fuel consumption of an automobile vehicle and reduction in production cost. Also, the presence of the magnet that is superior in the temperature characteristic provides an excellent advantage especially when such a motor is applied to a particular part that requires resistance to the high temperature.

The entire content of a Patent Application No. TOKUGAN 2001-147831 with a filing date of May 17, 2001 in Japan is hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A rare earth magnet alloy including Nd, Fe and B comprising:

hard magnetic phases each of which has a size equal to or less than 80 nm;

soft magnetic phases each of which has a size equal to or less than 80 nm, with the hard and soft magnetic phases being present in a mixed structure; and partly anisotropic regions having the hard magnetic chases and the soft magnetic phases, axes of easy magnetization of the hard magnetic phases in the partly anisotropic regions being aligned in one direction, each of the partly anisotropic regions having a size equal to or greater than 0.1 $\mu m$.

2. A rare earth magnet alloy according to claim 1, wherein the rare earth magnet alloy has compositions expressed by a chemical formula $Nd_xFe_{100-x-y-z}B_yV_z$(4<x<10,4<y<7and 0<z<2).

3. A rare earth magnet alloy according to claim 2, wherein in the chemical formula, an amount of 0.01 to 80 atom % of Nd is replaced with Pr.

4. A rare earth magnet alloy according to claim 2, wherein in the chemical formula, an amount of 0.01 to 10 atom % of Nd is replaced with Dy or Tb.

5. A rare earth magnet alloy according to claim 2, wherein in the chemical formula, an amount of 0.01 to 80 atom % of Fe is replaced with Co.

6. A rare earth magnet alloy according to claim 5, wherein in the chemical formula, Fe or Co are replaced by one or more elements selected from the group consisting of Al, Mo, Zr, Ti, Sn, Cu, Ga and Nb, the one or more elements being added in an amount of 0.1 to 3 atom % of a total amount of the rare earth magnet alloy.

7. A rare earth magnet alloy according to claim 1, wherein each of the hard magnetic phases and the soft magnetic phases has a size equal to or less than 60 nm.

8. A method of manufacturing a rare earth magnet alloy, including Nd, Fe and B comprising:

preparing an ingot of rare earth magnet composition; obtaining a molten mass of the ingot of the rare earth composition; and subjecting the molten mass to a rapid cooling treatment to obtain an alloy of rare earth magnet, which having:

hard magnetic phases each of which has a size equal to or less than 80 nm;

soft magnetic phases each of which has a size equal to or less than 80 nm, with the hard and soft magnetic phases being present in a mixed structure; and partly anisotropic regions having the hard magnetic phases in the partly axes of easy magnetization of the hard magnetic phases axes of easy magnetization of the hard magnetic phases in the partly anisotropie regions being aligned in one direction, each of the partly anisotropic regions having a size equal to or greater than 0.1 μm.

9. A method of claim 8, wherein the alloy of rare earth magnet is formed in a thin strip of a crystalline alloy with a thickness of a value between from 10 to 300 μm.

10. A method of claim 9, wherein the molten mass is ultra rapidly cooled to form an amorphous ribbon and the amorphous ribbon is heat treated to obtain the alloy of rare earth magnet.

11. A method of claim 10, wherein the amorphous ribbon is heat treated at a temperature equal to or less than 800° C.

12. A method of manufacturing an anisotropic exchange spring magnet, comprising: preparing an alloy of rare earth magnet including Hd, Fe and B wherein the alloy of rare earth magnet comprises A hard magnetic phases each of which has a size equal to or less than 80 nm;

soft magnetic phases each of which has a size equal to or less than 80 nm, with the hard and soft magnetic phases being present in a mixed structure; and partly anisotropic regions wherein axes of easy magnetization of the hard magnetic phases are aligned in one direction, each of partly anisotropic regions having a size equal to or greater than 0.1 μm;

crushing the alloy of type rare earth magnet to a size equal to or less than the size of each of the partly anisotropic regions to obtain magnet powder;

pressing the magnet powder in a magnetic field to obtain a pressed powder body; and subjecting the pressed powder body to a pressing and sintering treatment in a discharge plasma to obtain a bulk magnet.

13. A method of claim 12, wherein crushing is run with a wet type ball mill or a dry type ball mill to crush the type rare earth magnet alloy.

14. A method of claim 12, wherein the bulk magnet has a density equal to or greater than 95% of a true density of the type rare earth magnet alloy.

15. A method of claim 12, wherein the pressing and sintering treatment in the discharge plasma is carried out at a temperature equal to or less than 800° C.

16. A motor comprising:

a stator;

windings located in the stator;

a rotor opposed to the stator; and magnets each of which is mounted on the rotor and is an anisotropic exchange spring magnet comprised of an alloy of rare earth magnet including Nd, Fe, and B;

wherein the alloy of rare earth magnet comprises:

hard magnetic phases each of which has a size equal to or less than 80 nm;

soft magnetic phases each of which has a size equal to or less than 80 nm, with the hard soft magnetic phases being present in a mixed structure; and partly anisotropic regions having the hard magnetic phases and the soft magnetic phases, axes of easy magnetization of the hard magnetic phases in the partly anisotropic regions being aligned in one direction, and each of partly anisotropic regions having a size equal to or greater than 0.1 μm.

17. The rare earth magnet alloy according to claim 1, formed by the following steps:

crushing the rare earth magnet alloy to a powder with a particle size equal to or less than 25 μm; and applying a magnetic field orientation to the powder to form an aggregate magnet powder having a degree of anisotropy which is obtained by dividing a magnitude of a magnetization at 16 kOe in a direction parallel to a magnetically oriented direction by a magnitude of a magnetization at 16 kOe in a direction perpendicular to the magnetically oriented direction, exhibits a value equal to or greater than 1.1.

* * * * *